United States Patent [19]

Nagano

[11] Patent Number: 4,895,553
[45] Date of Patent: Jan. 23, 1990

[54] DERAILLEUR FOR A BICYCLE
[75] Inventor: Masashi Nagano, Izumi, Japan
[73] Assignee: Shimano Industrial Company Limited, Osaka, Japan
[21] Appl. No.: 147,513
[22] Filed: Jan. 25, 1988
[30] Foreign Application Priority Data Jan. 28, 1987 [JP] Japan .................................. 62-17798

[51] Int. Cl.⁴ .......................................... F16H 11/08
[52] U.S. Cl. ......................................... 474/80; 474/82
[58] Field of Search ............................. 474/78, 80, 82
[56] References Cited

U.S. PATENT DOCUMENTS

| | | | |
|---|---|---|---|
| 3,181,383 | 5/1965 | Juy | 474/82 |
| 4,183,255 | 1/1980 | Leiter | 474/82 |
| 4,362,523 | 12/1982 | Huret | 474/82 |
| 4,406,643 | 9/1983 | Shimano | 474/82 |
| 4,573,949 | 3/1986 | Nagano | 474/80 |
| 4,627,827 | 12/1986 | Juy | 474/80 |
| 4,690,663 | 9/1987 | Nagano | 474/80 |
| 4,692,131 | 9/1987 | Nagano | 474/80 |
| 4,731,045 | 3/1988 | Nagano | 474/78 |
| 4,734,084 | 3/1988 | Nagano | 474/80 |
| 4,755,162 | 7/1988 | Nagano | 474/82 |

FOREIGN PATENT DOCUMENTS 3616862 12/1986 Fed. Rep. of Germany .
348984 5/1931 United Kingdom .................. 474/80

Primary Examiner—Jerome W. Massie, IV
Attorney, Agent, or Firm—Stevens, Davis, Miller & Mosher

[57] ABSTRACT

A derailleur for a bicycle is provided in which a support member is pivotally supported to a movable member of a linkage mechanism having a forcible movement mechanism. A chain guide is fixed to the support member at adjustable positions, so that the chain guide position can be adjusted by the forcible movement mechanism to change the moving direction of the chain guide. This enables the position of a guide pulley of the chain guide to be adjusted in position with respect to each sprocket of a multi-stage sprocket assembly.

6 Claims, 4 Drawing Sheets

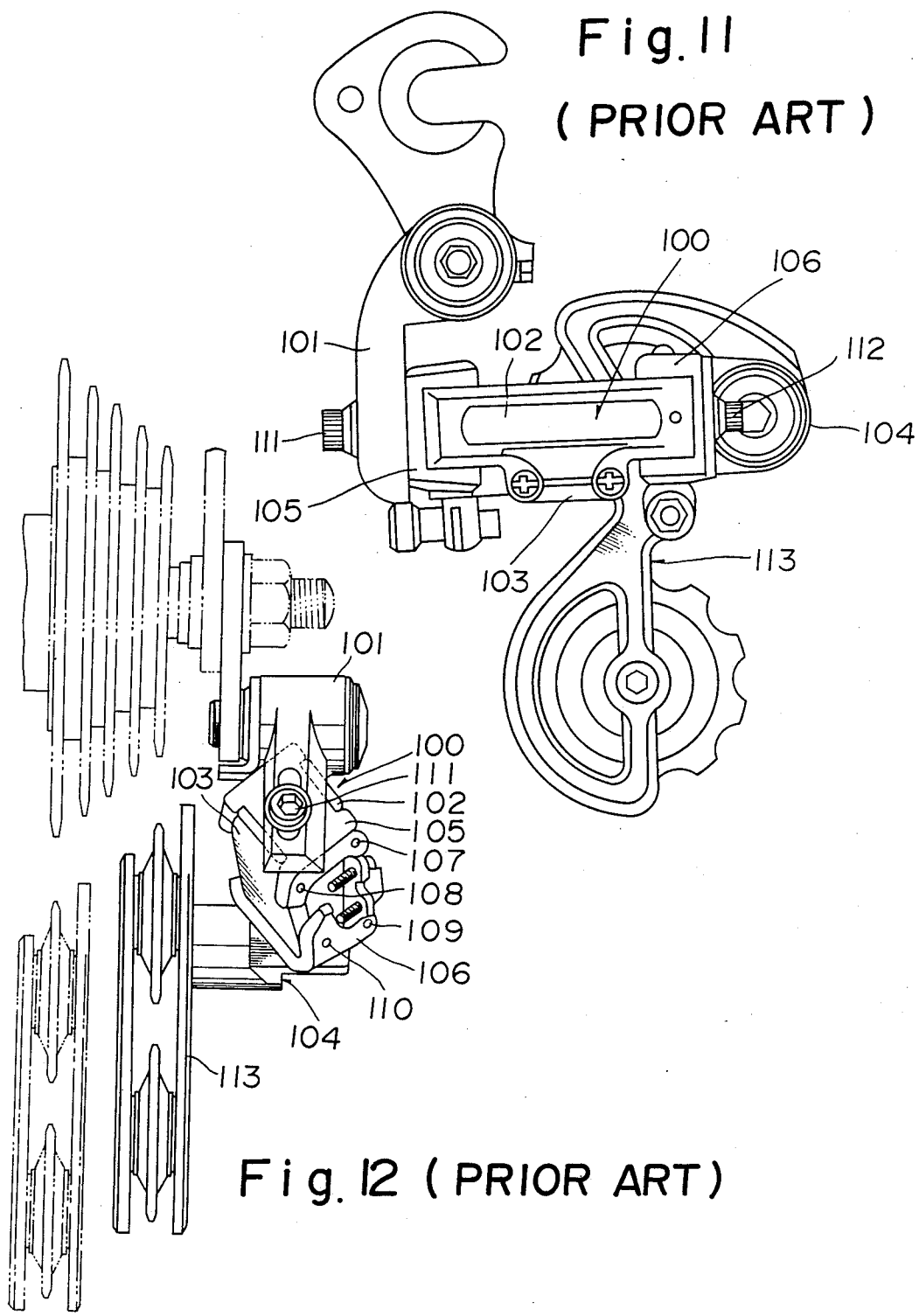

DERAILLEUR FOR A BICYCLE

FIELD OF THE INVENTION

The present invention relates to a derailleur for a bicycle, and more particularly, to a derailleur for a bicycle, which comprises a deformable linkage mechanism comprising a base member, two linkage members and a movable member, and a chain guide provided with a tension pulley and a guide pulley which guides a driving chain to a multistage sprocket assembly so that the chain is shifted to one desired sprocket of the multistage sprocket assembly for changing the bicycle speed.

BACKGROUND OF THE INVENTION

Conventionally, bicycle derailleurs constructed as described above, which, when the linkage mechanism is deformed, change the moving direction of the chain guide from the axial direction of the multistage sprocket assembly to the radial direction thereof in the plane perpendicular to the axis of the sprocket assembly, or to a slantwise direction of the axis of the sprocket assembly, has been disclosed in Japanese Patent Publication Gazette No. Sho 55-22,315 and is well known.

This type of conventional derailleur, a shown in FIGS. 11 and 12, is provided with two first and second connecting members 105 and 106 which are not part of a linkage mechanism 100 which comprises four members: a base member 101, linkage members 102 and 103 and a movable member 104, with linkage members 102 and 103 being pivoted at both ends to the connecting members 105 and 106 respectively. The first connecting member 105 is rotatably mounted to the base member 101 and the second connecting member 106 is similarly mounted to the movable member 104 through adjusting shafts 111 and 112 extending perpendicular to pivot shafts 107 through 110 for the linkage members 102 and 103 and lengthwise thereof. Also, an angular orientation of the first connecting member 105 with respect to the base member 101 and that of the second connecting member 106 with respect to the movable member 104 are made adjustable respectively. Accordingly, the first connecting member 105 can be adjusted in its angle with respect to the base member 101, thereby enabling a slant angle of the respective pivot shafts 107 to 110 at the linkage members 102 and 103 and the chain guide 113 supported to the movable member 104 to be changed in the moving direction with respect to the multistage sprocket assembly. In addition, during the adjustment, it is required that the second connecting member 106 be rotated an amount equal to rotation of the first connecting member 105 so as to adjust the axis of each pulley of chain guide 113 to be parallel to the axis of the multistage sprocket assembly. Thus, even when the multistage sprocket assembly is changed in construction to a wide-type sprocket assembly (a difference in tooth number of each sprocket is large) or a close-type sprocket assembly (the difference in tooth number is small), an interval between a guide pulley 51 and each sprocket can be made about constant.

In such conventional derailleur, however, when the connecting members 105 and 106 are rotated to change the moving direction of the chain guide 113, a slant angle of each pivot shaft at the linkage members 102 and 103 changes with the result that an exact amount of axial movement of the chain guide with respect to a swinging angle of the respective linkage members 102 and 103 changes. Therefore, an amount of axial movement of the chain guide 113 for the multistage sprocket assembly changes with respect to the operational stroke of a control wire to deform the linkage mechanism, thereby creating a problem in that the operation stroke of the control wire must be changed.

This problem can be solved, for example, by making the linkage members 102 and 103 adjustable in length so as to change the length thereof, or by changing the lever stroke of a control lever to operate the control wire. In the former case, the derailleur not only is large in size as a whole but also has a poor appearance. In the latter case, an adjustable control lever must be used so that a control lever provided with a positioning mechanism cannot be used, and also since swinging angles of the linkage members 102 and 103 increase during the shifting of a chain to a larger diameter sprocket, a torsion angle of a return spring increases for the derailleur provided therewith, thereby creating a problem in that the return spring has diminished durability. Also, for a control lever provided with an indicator for indicating the operating position of the control lever, the indicator may be shifted, thereby creating a problem in that the control lever provided with the positioning mechanism cannot be used.

The conventional derailleur, which is provided with the two connecting members 105 and 106 separate from the linkage mechanism 100, is both complicated in construction and also requires troublesome adjustment of the axis of each pulley of the chain guide when they are changed in their moving directions. Also, there is a risk that the connecting members 105 and 106, during use, will carelessly rotate to change the moving direction and parallel relationships of the chain guide 113.

SUMMARY OF THE INVENTION

An object of the present invention is to provide a derailleur which can change the moving direction of a chain guide with respect to the addendum of the multistage sprocket assembly by simply changing the relative position of a chain guide with respect to a movable member, without changing the moving direction of the chain guide by a forcible movement mechanism with respect to the multistage sprocket assembly and the operational stroke of a control wire, thus providing a derailleur especially adapted for use with both close-type and wide-type sprocket assemblies.

The derailleur of the invention comprises a deformable linkage mechanism comprising a base member, two linkage members and a movable member; and a chain guide provided with a tension pulley and a guide pulley for guiding a driving chain to the multistage sprocket assembly so that the chain is shifted to a desired sprocket of the multistage sprocket assembly to change the bicycle speed. The linkage mechanism is provided with a forcible movement mechanism to move the chain guide axially of the multistage sprocket assembly and radially thereof in a plane perpendicular to the axis of the same when the linkage mechanism is deformed. A support member is pivoted to the movable member, and a tension spring for rotating the support member in the direction of applying tension to the chain is interposed between the support member and the movable member. The chain guide is adjustably fixed to the support member at a position spaced from the pivoted position of the support member to the movable member.

The chain guide is adjusted in position with respect to the support member to change the relative position of the chain guide to the movable member, thereby enabling the moving direction of the chain guide with respect to the multistage sprocket assembly to be simply changed without changing the moving direction of the same by the forcible movement mechanism. Even with respect to multistage sprocket assemblies having different sprocket constructions, an interval between the guide pulley at the chain guide and each sprocket can be made about constant, thereby keeping the speed change efficiency always satisfactory, and furthermore, the support member is provided to change the relative position of the chain guide with respect to the movable member. Hence, the moving direction of the chain guide can be changed while ensuring a constant amount of axial movement thereof even without changing an operational stroke of a control wire for deforming the linkage mechanism. Furthermore, since the moving direction of the chain guide by the forcible movement mechanism with respect to the multistage sprocket assembly, in other words, the slant angle in the conventional derailleur, is not changed, the derailleur of the invention is simple in construction, small-sized as a whole, and has a structure making it easy to change the moving direction as described above.

The present invention is further characterized in that the linkage mechanism is provided with a fixing member having a mounting shaft fixed to the bicycle frame, the base member is supported rotatably with respect to the mounting shaft, and a link spring is interposed between the fixing member and the base member and biases the linkage mechanism, against the aforesaid tension spring, in the direction of moving the guide pulley away from and radially outwardly of the multistage sprocket assembly.

Thus, the chain guide can be adjusted in position with respect to the movable member and automatically changed in its moving direction, thereby enabling the changing operation to be more easily carried out.

The above and further objects and novel features of the invention will be more fully apparent from the following detailed description when the same is read in connection with the accompanying drawings.

BRIEF DESCRIPTION OF THE DRAWINGS

FIG. 11 is a front view of a conventional derailleur; and

FIG. 12 is a side view of the FIG. 11 derailleur.

DETAILED DESCRIPTION OF THE INVENTION

Figure 1:
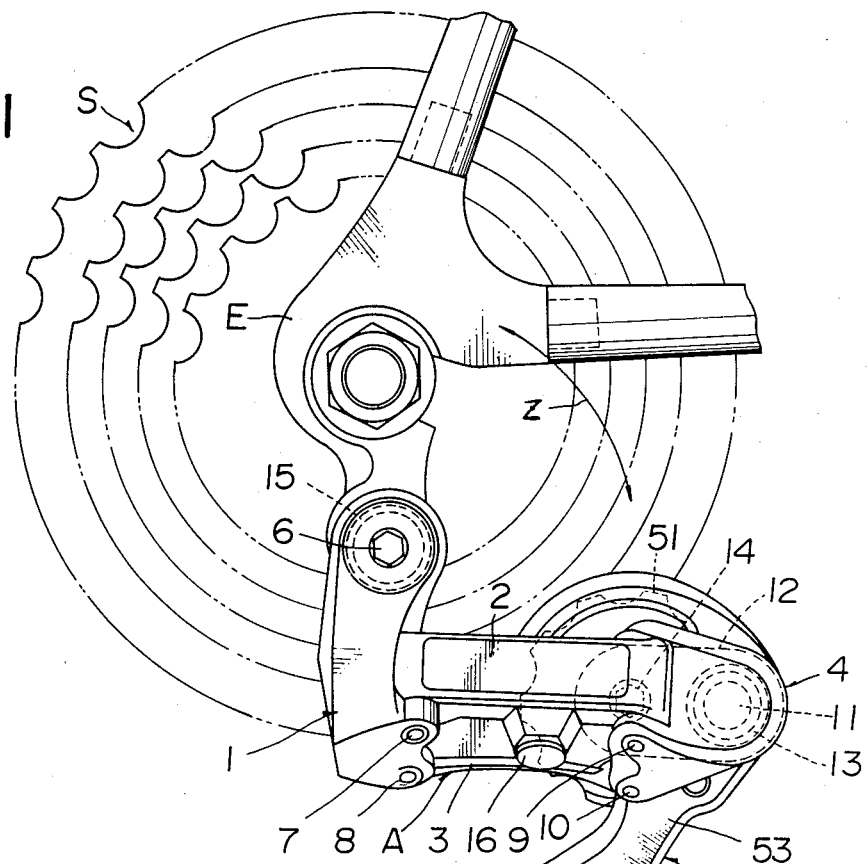
FIG. 1 is a front view of an embodiment of a derailleur of the invention which is used together with a multistage sprocket assembly.
Figure 2:
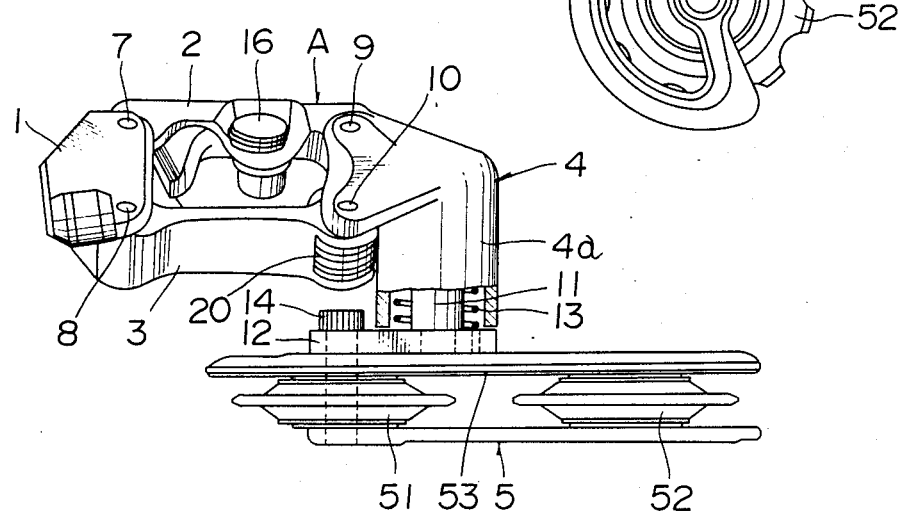
FIG. 2 is a bottom view of the derailleur only.
Figure 3:
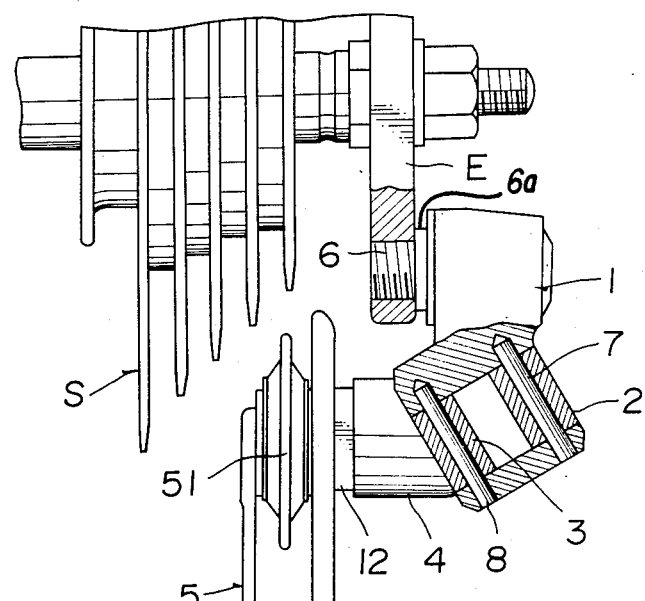
FIG. 3 is a partially cutaway side view of the derailleur, corresponding to FIG. 1.

The derailleur of the present invention, as shown in FIGS. 1 to 3, is used together with a multistage sprocket assembly S mounted to a rear hub of the bicycle and basically comprises a deformable linkage mechanism A comprising a base member 1, two linkage members 2 and 3 and a movable member 4, and a chain guide 5 having a guide pulley 51 for guiding a driving chain to the multistage sprocket assembly S, a tension pulley 52, and a plate 53 for supporting the pulleys 51 and 52 as shown in FIGS. 1 and 2.

The base member 1, as shown in FIG. 3, is supported rotatably to the fork end E at the bicycle through a mounting shaft 6 extending in the same direction as the axis of the multistage sprocket assembly S.

In the embodiment shown in FIGS. 1 to 3, the mounting shaft 6 is fixedly screwed with the fork end E and supports the base member 1 to be rotatable in a fixed range. In addition, in FIG. 3, a reference numeral 6a is a fixed member fixed to the mounting shaft 6, and between the fixed member 6a and the base member 1 is interposed a link spring 15 to be discussed in detail below. Base member 1 is provided at one side with a pair of mounting projections positioned opposite to each other, to which the linkage members 2 and 3 are pivotally mounted through a pair of pins 7 and 8, and the movable member 4 is pivoted to the free ends of the linkage members 2 and 3 through a pair of pins 9 and 10 respectively.

The movable member 4 is similar in shape to the base member 1 and is provided at one side with mounting projections disposed opposite to each other, with pins 9 and 10 being mounted on the mounting projections, thereby being pivoted mutually swingably to the linkage members 2 and 3, and at its other side with a bearing portion 4a.

The linkage mechanism constructed as described above is provided between, for example, the linkage member 2 or 3 and the movable member 4 or base member 1 with a return spring 20, by which the chain guide 5 is biased axially of the multistage sprocket assembly S, that is, toward a smaller diameter sprocket or a larger diameter one, and normally toward the former.

In the embodiment shown in FIGS. 1 through 7, the pins 7 and 8 through which the linkage members 2 and 3 are connected and those 9 and 10 through which the movable member 4 is connected to the linkage members 2 and 3, are slanted with respect to the plane perpendicular to the axis of the sprocket assembly S. As a result, when the linkage mechanism A is deformed, the chain guide 5 is forcibly moved axially of the multistage sprocket assembly and radially in the plane perpendicular to the axis thereof. A pivot shaft 11 extending in the same direction as the axis of the multistage sprocket assembly S is rotatably supported to the bearing 4a at the movable member 4. A plate-like support member 12 is fixed to the axial end of support shaft 11 by caulking or the like so as to be pivoted to the movable member 4 through the pivot shaft 11. A tension spring 13 for rotating the support member 12 in the direction of applying tension to the chain is inserted between the support member 12 and the movable member 4. A plate 53 at the chain guide 5 is supported so that its angular position can be adjusted, through a mounting screw 14 at a position on the support member 12 shifted from the position at which support member 12 is pivoted to the movable member 4, that is, the position at which support member 12 is fixed to the pivot shaft 11.

The base member 1 is swingably supported to the fork end E through the pivot shaft 6 in order to move the guide pulley 51 toward or away from (in the direction of the arrow Z in FIG. 1) the axis of the sprocket assembly S, and between the fixed member 6a fixed to the pivot shaft 6 and the base member 1 is interposed a link spring 15 which is a coil spring, to bias the guide pulley 51 to move away from (clockwise in FIG. 1) the axis of the sprocket assembly S to thereby adjust the radial position of the guide pulley 51 with respect to the multistage sprocket assembly S by use of a balance of the tension spring 13 with the linkage spring 15. Also, when the chain guide 5 is adjusted in position with respect to the support member 12, the base member 1 at the linkage mechanism A is adapted to rotate around the pivot shaft 6.

In addition, a fixture 16 for a control wire (not shown) is provided at the linkage member 2 so that the control wire fixed to the wire fixture 16 is operated to deform the linkage mechanism A.

Figure 4:
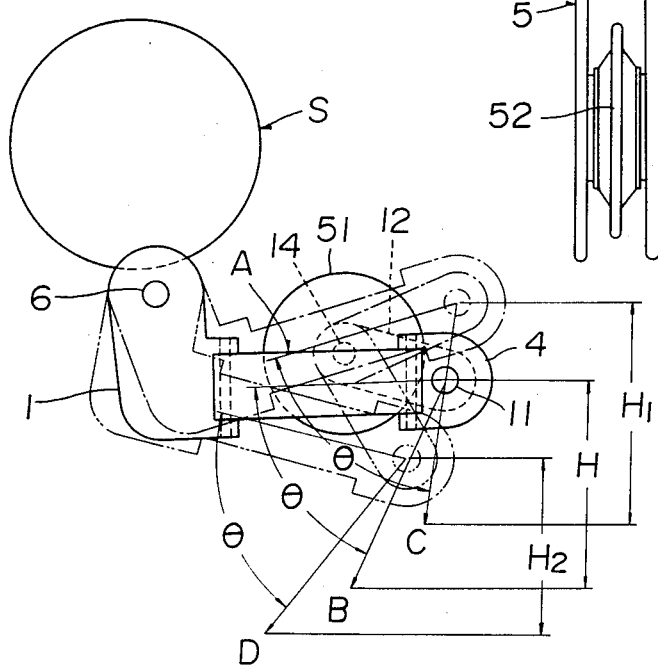
FIGS. 4 through 7 are views illustrating operation of the derailleur of the invention.
Figure 5:
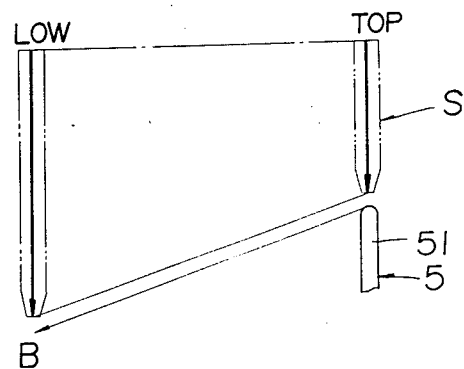

In the above-described construction, the moving directions of the chain guide 5 and movable member 4 with respect to the multistage sprocket assembly are established by forcible movement by the forcible movement mechanism caused by the slanted pins 7 through 10 and balance of the springs 13 and 15. As shown in FIG. 4, when the chain guide 5 moves from the position corresponding to the smallest diameter sprocket of the multistage sprocket assembly to that corresponding to the largest diameter sprocket, the movable member 4 is set to move a fixed distance in the direction of the arrow B (axially and radially of the axis of the multistage sprocket assembly).

The position of the plate 53 relative to the support member 12 is adjusted and the positional relationship between the chain guide 5 and the movable member 4 is adjusted, so that the chain guide 5 and movable member 4 can be changed in the moving directions thereof with respect to the multistage sprocket assembly S without changing the axial positions of the same with respect to the multistage sprocket assembly S by the forcible movement mechanism. In other words, when the chain guide 5 is adjusted in an angle clockwise in FIG. 1 with respect to the support member 12, the tension pulley 52 is adjusted in position leftwardly from the position shown in FIG. 1 to provide an increase in chain tension, whereby the linkage mechanism A balanced in stable condition overcomes the link spring 15 to swing counterclockwise around the pivot shaft 6.

Such swinging motion continues until the link spring 15 balances with the tension spring 13, and, when the chain engages with the guide pulley 51, is carried out around the mounting screw 14, in turn the axis of rotation of guide pulley 51, while the support member 12 rotates relative to the movable member 4. Hence, when the chain guide 5 is adjusted in an angle clockwise in FIG. 1 with respect to support member 12, the support member 12 is shifted from the position shown by the dotted line to that shown by the one-dot-chain line in FIG. 4 and the linkage mechanism A is adjusted to shift from the position shown by the solid line to that shown by the one-dot chain line in FIG. 4. As a result, the movable member 4 supporting the chain guide 5 is changed in its moving direction from the direction shown by the arrow B to that shown by the arrow C.

On the other hand, when the chain guide 5 is adjusted in position counterclockwise in FIG. 1 with respect to the support member 12, the tension pulley 52 shifts rightwardly from the position shown in FIG. 1, whereby the chain tension decreases to swing the linkage mechanism A by action of the link spring 15 clockwise from the position where the linkage mechanism A is * stably balanced. As a result, the support member 12 shifts from the position shown by the dotted line to that shown by the two-dot chain line in FIG. 4, and the linkage mechanism A is adjusted to shift from the position shown by the solid line to that shown by the two-dot chain line in FIG. 4, so that the moving direction of the movable member 4 supporting the chain guide 5 is changed as shown by the arrow B to D.

Adjustment of an angle of the chain guide 5 relative to the support member 12 is carried out by loosening the mounting screw 14, but the supporting portion of chain guide 5 to the support member 12 is given a friction force larger than the chain tension, whereby the chain guide 5 may be rotated with respect to the support member 12 by a force larger than the friction force.

Figure 8:
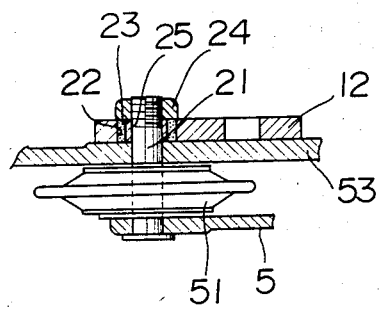
FIG. 8 is a partial sectional view of the principal portion of a modified embodiment of the derailleur of the invention, in which a chain guide is adjusted in position with respect to a support member.

In this embodiment, a friction means to hinder the rotation of chain guide 5 with respect to the support member 12 is, for example, as shown in FIG. 8, so constructed that a mounting shaft 21 is fixed to the chain guide 5 and the support member 12 is provided with a through bore 22 for inserting therein the mounting shaft 21. A friction member 23 is interposed between the chain guide 5 and the support member 12, thereby applying friction to the relative rotation of the chain guide 5 to the support member 12. In addition, in FIG. 8, a reference numeral 24 designates a nut, and 25 designates a collar.

Alternatively, in the construction shown in FIG. 2, the degree of tightening the mounting screw 14 may be limited to apply friction at a contact surface between the plate 53 of the chain guide 5 and the support member 12 and at the position where the mounting screw 14 is tightened.

The derailleur constructed as described above, when applied to the bicycle, is disposed outside the smallest diameter sprocket at the sprocket assembly S as shown in FIG. 3, with the chain engaging with the guide pulley 51 and tension pulley 52. The control wire fixed to the linkage member 2 through the fixture 16 is operated to deform the linkage mechanism A, so that the chain guide 5 and movable member 4 move toward the larger diameter sprocket in parallel to the axis of the multistage sprocket assembly S by means of the forcible movement mechanism by slanted pins 7 through 10 and by means of balancing of spring 13 with spring 15, and also radially of the multistage sprocket assembly in the plane perpendicular to the axis of such assembly.

In this embodiment, when the movable member 4 is set to move in the direction shown by the arrow B in FIG. 4, assuming that an amount of radial movement of the movable member 4 with respect to the multistage sprocket assembly S is a distance H, the chain guide 5 also moves in the same direction (arrow B in FIG. 4) as the movable member 4, and is equal in its amount of radial movement to the movement H of the movable member 4, thereby enabling an interval between the guide pulley 51 and each sprocket at the multistage sprocket assembly to be kept about constant.

If the multistage sprocket assembly S is changed to a wide-type sprocket assembly, the guide pulley 51 is kept in a position at which the guide pulley 51 corresponds to the smallest diameter sprocket and the chain guide 5 is adjusted in its angle orientation with respect to the support member 12, thereby shifting the movable member 4 with respect to the chain guide 5. Thus, the moving direction of the movable member 4 with respect to the multistage sprocket assembly S can be changed from the direction B to that C or D as described above without shifting the guide pulley 51 with respect to the smallest diameter sprocket, and an amount of radial movement of the chain guide 5 with respect to the multistage sprocket assembly S can be changed while the chain guide 5 is moving from the position corresponding to the smallest diameter sprocket to that corresponding to the largest diameter sprocket.

Figure 6:
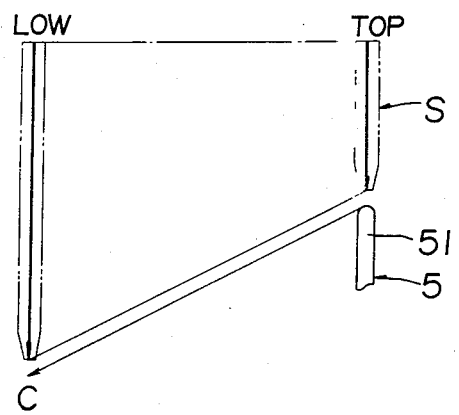

When the support member 12, as described above, is adjusted at a predetermined angle counterclockwise from the position shown by the dotted line in FIG. 4 so as to change the moving direction of the movable member 4 in the direction of the arrow C, an amount of radial movement of the movable member 4 with respect to the multistage sprocket assembly while the chain guide 5 is moving from the position corresponding to the smallest diameter sprocket to that to the largest diameter one, can be changed by a distance $H_1$ larger than H. As a result, the chain guide 5 also moves in the direction of the arrow C so as to enable the radial movement distance to be increased in $H_1$ larger than H. Therefore, even when the derailleur of the invention is applied to a wide-type multistage sprocket assembly as shown in FIG. 6, an interval between the guide pulley 51 and each sprocket can be made about constant, thereby always keeping a proper speed change efficiency.

When the support member 12, as described above, is adjusted in a predetermined angle clockwise with respect to the chain guide 5 from the position shown by the dotted line in FIG. 4 so as to change the movement of the movable member 4 in the direction of the arrow D, an amount of radial movement of the moving member 4 with respect to the multistage sprocket assembly S while the chain guide 5 is moving from the position corresponding to the smallest diameter sprocket to that corresponding to the largest diameter sprocket can be changed to a distance $H_2$ smaller than H. As a result, the chain guide 5 also moves in the same direction as the arrow C, thereby enabling the radial movement of the chain guide 5 to be reduced to the distance $H_2$ smaller than H.

Figure 7:
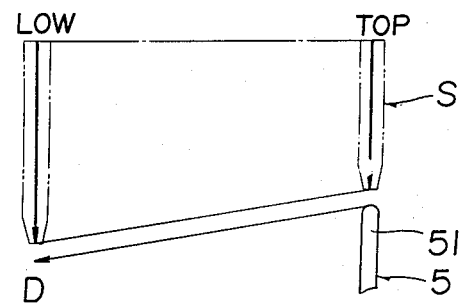

Accordingly, even when the derailleur of the invention is applied to a close-type multistage sprocket assembly as shown in FIG. 7, the interval between the guide pulley 51 and each sprocket can be made about constant, thereby always keeping the speed change efficiency at a satisfactory level.

Figure 9:
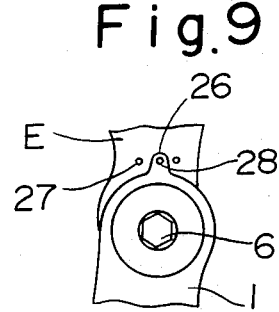
FIG. 9 is a partial view illustrating fixing of a linkage mechanism to a fork end of the bicycle.

Alternatively, as shown in FIG. 9, the base member 1 may be provided with a tongue 26 and the fork end E with a plurality of threaded bores 27, the tongue 26 being fixed to the fork end E through a fixing screw 28 screwable with each threaded bore 27. Also, base member 1 which rotates around the mounting shaft 6, may be fixed to the fork end $E_1$ to be changeable in its angular relationship relative thereto. In this embodiment, when the chain guide 5 is adjusted in position with respect to the support member 12, the screwing position of the fixing screw 28 is changed to adjust an angle of the base member 1 with respect to the fork end E, thereby rotating the linkage mechanism A. In this embodiment, a plurality of engaging portions may be provided at, for example, one of the base member 1 and fork end E, and a retainer portion engageable with one of the engaging portions may be provided at the other, thereby positioning the linkage mechanism A with respect to the fork end E.

Figure 10:
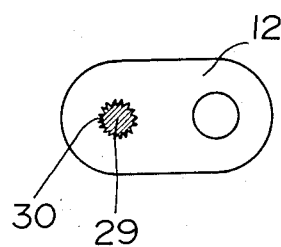
FIG. 10 is a partial sectional view of another modified embodiment of the invention for adjusting the chain guide in position.

Alternatively, as shown in FIG. 10, the chain guide 5 may be provided with a polygonal support shaft 29 and the support member 12 may be provided with a bore 30 into which the support shaft 29 is fitted, thereby adjusting an angular position of the chain guide 5 with respect to the support member 12.

Also, the forcible movement mechanism for the chain guide 5, which in the described embodiments comprises the slanted pins 7 through 10, is not particularly defined or limited in construction.

Although several embodiments have been described, they are merely exemplary of the invention and not to be construed as limiting, the invention being defined solely by the appended claims.

What is claimed is:

1. A derailleur for a bicycle for shifting a drive chain from one sprocket to another of a multistage sprocket assembly of said bicycle, said derailleur comprising:
    (a) a deformable linkage mechanism comprising a base member, two linkage members interconnecting said base member and a movable member, said linkage members comprising a forcible movement mechanism for moving said movable member, responsive to deformation of said linkage mechanism, axially of said multistage sprocket assembly and radially of said multistage sprocket assembly in a plane adapted to be oriented perpendicular to an axis of said multistage sprocket assembly when said derailleur is mounted on said bicycle, and a mounting shaft for mounting said base member rotatably to said bicycle frame;
    (b) a chain guide including a guide pulley, for guiding said chain to and from each sprocket of said multistage sprocket assembly, and a tension pulley;
    (c) support means for supporting and interconnecting said chain guide and said movable member and comprising a support member pivotally supported at a first pivot axis to said movable member and supported at a second axis to said chain guide, said second axis being spaced apart from said first axis;
    (d) position adjusting means for adjustably fixing an angular position of said chain guide relative to said support member at said second axis; and
    (e) a tension spring interposed between said support member and said movable member for biasing said support member in a direction of applying chain tension to said chain.

2. A derailleur for a bicycle according to claim 1, wherein said linkage mechanism includes a fixing member having a mounting shaft adapted to be fixed to the bicycle, said base member is supported rotatably relative to said mounting shaft for mounting said base member, and a link spring is disposed between said fixing member and said base member for biasing said linkage mechanism against said tension spring in a direction of moving said guide pulley away from and radially outwardly of said multistage sprocket assembly.

3. A derailleur for a bicycle according to claim 1, wherein said linkage mechanism includes a fixing means for fixing said linkage mechanism to the frame of the bicycle at a position at which said linkage mechanism rotates around said mounting shaft.

4. A derailleur for a bicycle according to claim 1, wherein said position adjusting means comprises a mounting screw for adjusting an angular position of said chain guide with respect to said support member.

5. A derailleur for a bicycle according to claim 1, wherein said position adjusting means comprises a mounting screw for mounting said chain guide on said support members and friction means for applying to said chain guide a friction force larger than said chain tension acting on said chain guide.

6. A derailleur for a bicycle according to claim 1, wherein said position adjusting means comprises a polygonal support shaft through which said chain guide is mounted on said support member and a polygonal fitting bore receiving therein said support shaft.

* * * * *